US005598973A

United States Patent [19]

Weston

[11] Patent Number: 5,598,973

[45] Date of Patent: Feb. 4, 1997

[54] FLUID FLOW CONTROL DEVICE

[76] Inventor: Colin K. Weston, 1204 Dreamcrest Rd., Mississauga, Ontario, Canada, L5V 1N7

[21] Appl. No.: 331,960

[22] Filed: Oct. 31, 1994

[51] Int. Cl.$^6$ .................... F16K 31/44; B05B 12/10

[52] U.S. Cl. .................... 239/75; 239/583; 251/273

[58] Field of Search .................... 239/583, 71, 75, 239/784, 581.2; 251/129.16, 273; 222/384, 386

[56] References Cited

U.S. PATENT DOCUMENTS

| | | | |
|---|---|---|---|
| 3,429,482 | 2/1969 | Nord et al. | 239/583 X |
| 4,150,770 | 4/1979 | Wieland et al. | 222/386 X |
| 4,556,193 | 12/1985 | Yoshiga | 251/273 X |
| 4,579,255 | 4/1986 | Frates et al. | 239/583 X |
| 4,711,379 | 12/1987 | Price | 222/504 |
| 4,907,741 | 3/1990 | McIntyre | 239/593 X |
| 4,976,404 | 12/1990 | Ichikawa et al. | 251/129.11 X |
| 4,989,830 | 2/1991 | Ratnik | 251/273 X |
| 5,249,773 | 10/1993 | Feld | 251/129.11 |
| 5,348,585 | 9/1994 | Weston | 118/305 |

FOREIGN PATENT DOCUMENTS

| | | | |
|---|---|---|---|
| 2589784 | 5/1987 | France | 239/75 |
| 264827 | 2/1950 | Switzerland | 239/75 |

*Primary Examiner*—Kevin Weldon

*Attorney, Agent, or Firm*—Donald E. Hewson

[57] ABSTRACT

An improved flow control mechanism for use in an automatic continuous flow liquid dispensing device for dispensing liquid through a dispensing output onto a receiving surface of an article, is disclosed. The improved flow control mechanism comprises a needle valve on a threaded elongate shaft, which shaft is threadably mounted on the dispensing device housing, for movement of the needle valve between a full flow position where the needle valve is retained in spaced relation with respect to the dispensing output opening so as to permit a full flow of liquid from the main chamber through the dispensing output opening, and a reduced flow position where the needle valve is retained in a reduced spaced relation with respect to the dispensing output opening so as to permit only a reduced flow of liquid from the main chamber through the dispensing output opening. A servomotor rotatably drives the threaded elongate shaft under the influence of a controlling computer that receives feedback signals from sensors mounted within the dispensing device housing. The position of the needle valve is regulated between its full flow position and its reduced flow position according to the feedback signals.

6 Claims, 5 Drawing Sheets

FLUID FLOW CONTROL DEVICE

FIELD OF THE INVENTION

This invention relates to liquid dispensing guns used in industry, such as glue dispensing guns, paint dispensing guns, and the like, and more particularly to mechanisms for controlling the flow rate of such liquid dispensing guns.

BACKGROUND OF THE INVENTION

Liquid dispensing guns are used in industry for a variety of applications. Such applications might include the dispensing of adhesives to a carton or the like, which adhesives might include hot melt, atmospheric setting, ultraviolet setting, temperature based curing adhesives, and self curing epoxies, among others; the dispensing of paint to an ornament or decorative object; the dispensing of lubricants to various parts of mechanisms or machines; and the dispensing of sealants to a wide variety of articles, among other applications. It is common to have such liquid dispensing guns operatively connected to a robotic arm or to an X-Y-Z table. In either case, the motion of the dispensing gun with respect to the article having liquid deposited thereon is independently controlled in each of the X, Y, and Z axes, and can be determined at any time or point along the path of the dispensing gun. The speed of the dispensing nozzle across the receiving surface is the vectorial sum of the X, Y, and Z components of the speed and may be calculated using the equation:

$$\text{surface speed}=(\text{speed in } X \text{ direction}^2+\text{speed in } Y \text{ direction}^2+\text{speed in Z direction}^2)^{1/2}$$

The dispensing guns for each particular application are designed so as to be specifically suited to that application. Each type of dispensing gun uses a valve, such as a needle valve, located within the nozzle of the dispensing gun at a dispensing output opening therein to open and close the dispensing output. The valve means is moveable, typically by way of an air actuated solenoid, between a full flow position where the liquid contained in the dispensing gun is dispensed through the dispensing output opening in the nozzle, and a flow precluding position where the valve means is intimately engaged against a co-operating seat so as to preclude the flow of liquid from the nozzle. In the full flow position, the needle valve contacts a back stop, thus defining the full flow position of the needle valve.

The flow rate of the fluid from such dispensing guns is selected depending on the particular application, the properties of the particular liquid being dispensed, and so on. It is important to select a proper flow rate as it is important to apply such liquids as a constant volume per unit length of liquid dispensed, with any more than a very minor variation being generally unacceptable. Most dispensing guns have manually selectable flow rate that is set by way of a hand operated control mechanism that positions the back stop so as to define the full flow position of the needle valve. This full flow position is typically set only once for a given application. A selected flow rate is, by definition, a constant volume of liquid flow per unit time. If the nozzle of the dispensing gun travels across the receiving surface at a constant speed, a corresponding constant volume of liquid will be dispensed per unit length of liquid dispensed along the receiving surface. However, if the nozzle of the dispensing gun does not travel across the receiving surface at a constant speed, the volume of liquid dispensed per unit length of liquid dispensed along the receiving surface will vary proportionately with the speed of travel of the nozzle across the receiving surface.

It is very important to be able to maintain a constant application of the liquid being dispensed per unit length of liquid dispensed along the receiving surface so as to preclude over-dispensing or under-dispensing. The amount of the liquid dispensed along an application path on a receiving surface can change as one or more of several related parameters change, such parameters including the speed of the nozzle of the dispensing gun with respect to the receiving surface, the temperature of the liquid, the viscosity of the liquid, the narrowing of the dispensing opening of the nozzle due to partial clogging, and so on. For instance, if the nozzle of the dispensing gun tracks a square corner, the speed of the nozzle across the receiving surface near or at the corner is less than the targeted predetermined speed of the nozzle across the receiving surface. In this instance, since the actual dispensing rate per unit time of the liquid from the nozzle does not change, an increase occurs in the amount of liquid dispensed per unit length of liquid dispensed at the corner—in other words, excess liquid is dispensed at the corner. Further, as the temperature of the liquid being dispensed rises, the viscosity may either fall or rise, depending on the type of liquid, which therefore causes a corresponding change in the amount of flow of liquid from the nozzle per unit time, and a corresponding change in the amount of liquid dispensed per unit length of liquid dispensed along the receiving surface. Also, as the dispensing of the liquid continues, it is possible that the nozzle can partially clog, thus reducing the amount of liquid dispensed per unit time, thus reducing the amount of liquid dispensed per unit length of liquid dispensed along the receiving surface. In any event, any substantial change in amount of liquid dispensed per unit length of liquid dispensed along the receiving surface is unacceptable.

It can be seen that it is necessary to control the rate of flow of liquid from a nozzle per unit time in order to regulate the amount of liquid per dispensed unit length of liquid dispensed along the receiving surface. For instance, as the nozzle traverses a right angled corner, the rate of liquid dispensed from the nozzle per unit time must be slowed in proportion to the speed of the nozzle across the receiving surface. This same principle also applies to a rounded corner. In such instance, the speed of the nozzle with respect to the receiving surface may have to be calculated vectorially on a continuing and instantaneous basis using the equation:

$$\text{surface speed}=(\text{speed in } X \text{ direction}^2+\text{speed in } Y \text{ direction}^2+\text{speed in Z direction})^{1/2}$$

Further, as the temperature of the liquid being dispensed rises, and the viscosity correspondingly drops, the amount of liquid flowing from the nozzle per unit time may increase, even though the size of the opening in the nozzle has not increased. Accordingly, the size of the opening in the nozzle may have to be correspondingly decreased. Further, as the nozzle becomes partially clogged through continuing use, it may be necessary to further open the valve within the nozzle so as to maintain a constant flow of liquid therefrom per unit length of liquid dispensed along the receiving surface.

Another problem with such prior art liquid dispensing guns is that the air actuated solenoid that operates the needle valve tends to open and close the valve quite abruptly. Accordingly, it is typical to have a sudden, but short lived, overflow of liquid shoot forth from the dispensing gun when the valve is first opened, which is highly undesirable, if not unacceptable.

DESCRIPTION OF THE PRIOR ART

U.S. Pat. No. 4,711,379 issued Dec. 8, 1987 to PRICE, discloses a proportional flow control dispensing gun that is pneumatically actuated and electrically controlled. In order to dispense a liquid from the dispensing gun, the liquid is supplied under pressure to a main chamber so as to be dispensable through a nozzle past a valve. To commence the flow of liquid, a torque motor is electrically actuated so as to move an air loaded spool downwardly against the three of a biasing spring. As the air loaded spool moves downwardly, a land thereon is passed a port so as to permit a passageway to be in fluid communication with a source of pressurized air. The other end of the passageway is in fluid communication with a piston mounted on the opposite end of the biasing spring, which piston moves upwardly with the equalized increase in air pressure against its bottom surface. As this piston moves upwardly, the control plug of the valve is moved away from its seat so as to permit the valve to open. The amount of valve opening is proportional to the amount of electrical power supplied to the torque motor. There are no feedback systems used to adjust the position of the control plug of the valve in accordance with changes in speed of the dispensing gun with respect to the receiving surface, temperature, viscosity, blockage of flow from the nozzle, and so on.

Indeed, it has been suggested in the patent document that since pressurized air is used to actuate the valve, that a balanced air valve needs to be used unless the source of compressed air is highly regulated.

SUMMARY OF THE INVENTION

In accordance with one aspect of the present invention, there is provided an improved flow control mechanism for use in an automatic continuous flow liquid dispensing device for dispensing liquid onto a receiving surface of an article, the dispensing device having an input for accepting liquid into a main chamber defined by an external housing and a dispensing output opening in fluid communication with the main chamber. The improved flow control mechanism comprises valve means operatively mounted with respect to the external housing for movement between a full flow position where the valve means is retained in spaced relation with respect to the dispensing output opening so as to permit a full flow of fluid from the main chamber through the dispensing output opening, and a reduced flow position where the valve means is retained in a reduced spaced relation with respect to the dispensing output opening so as to permit only a reduced flow of fluid from the main chamber through the dispensing output opening. An electrically powered drive means is operatively connected in driving relation to the valve means for selectively moving the valve means between the full flow position and the reduced flow position. A control means is operatively connected to the drive means for selectively controlling the movement of the drive means between the full flow position and the reduced flow position. There are sensor means mounted in the liquid dispensing device housing so as to sense selected parameters related to the operation of the liquid dispensing device, the sensor means being electrically connected to the control means so as to provide feedback signals to the control means. The control means is adapted to provide control signals to the drive means, the control signals based on the feedback signals from the sensor means, the control means thereby controlling the drive means according to the feedback signals.

BRIEF DESCRIPTION OF THE DRAWINGS

Embodiments of this invention will now be described by way of example in association with the accompanying drawings in which.

DETAILED DESCRIPTION OF THE PREFERRED EMBODIMENTS

Figure 1:
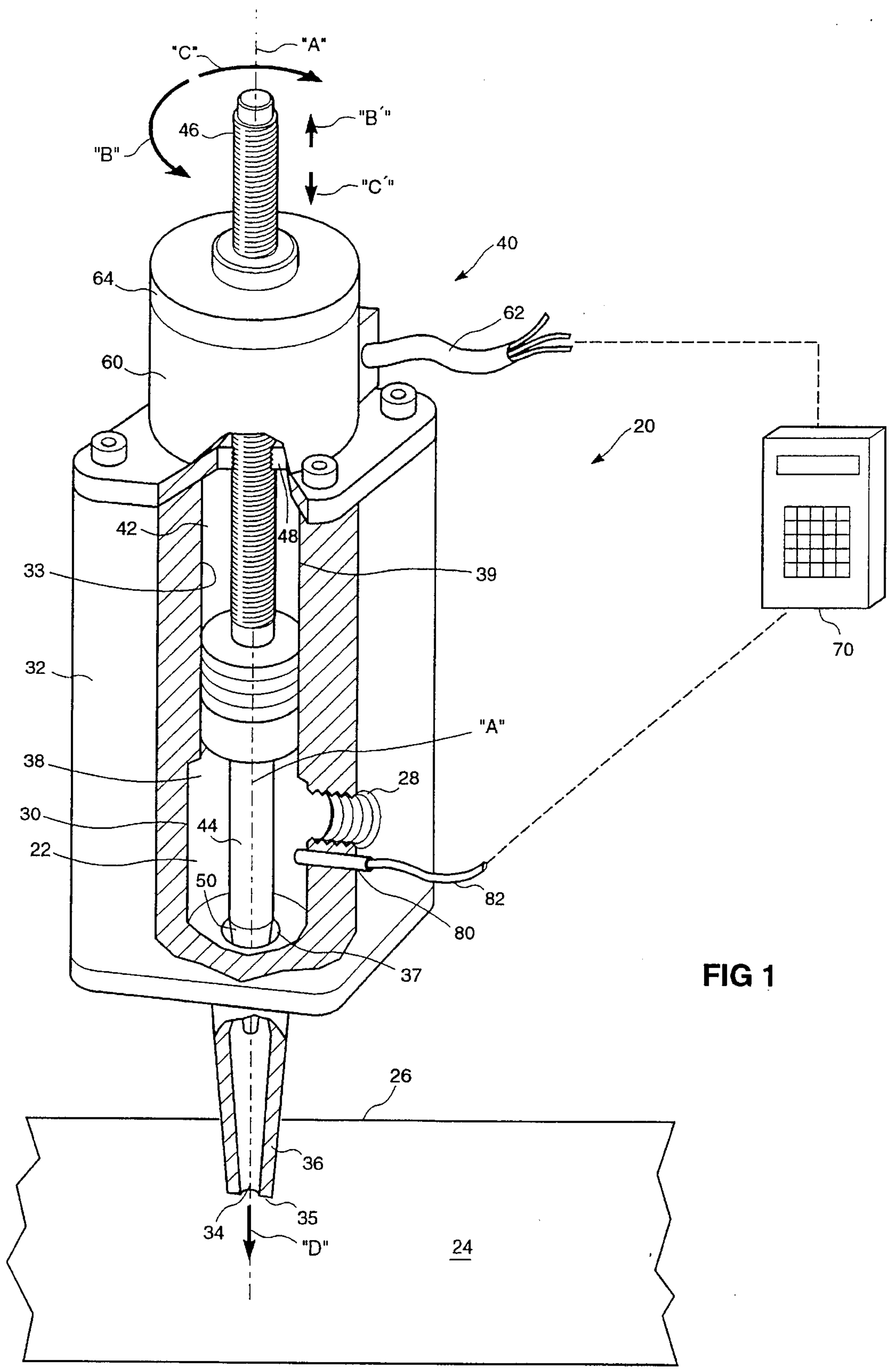
FIG. 1 is a perspective view of a preferred embodiment according to the present invention, with the valve being fully closed.
Figure 2:
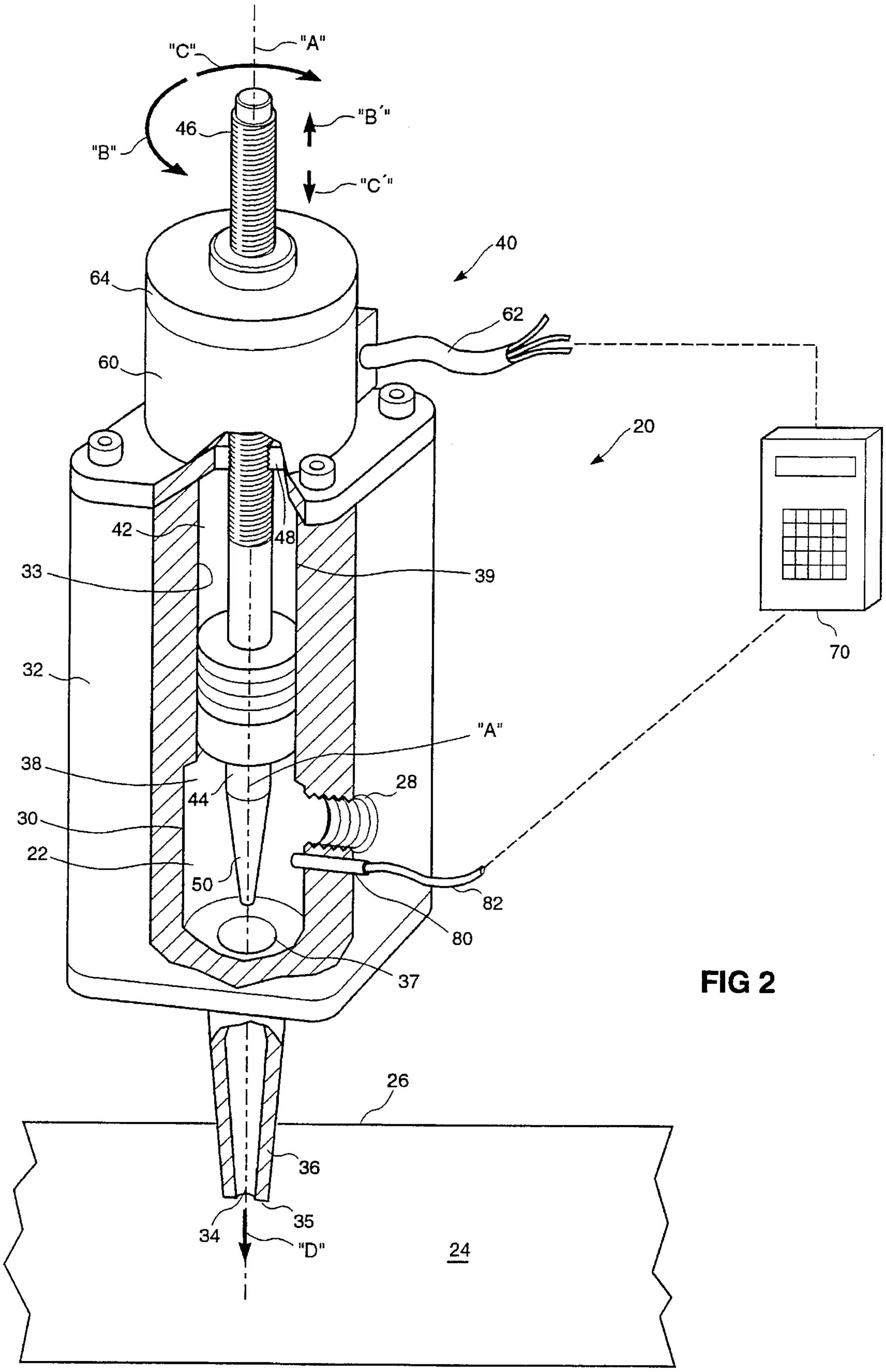
FIG. 2 is a view similar to FIG. 1, with the valve being set to a predetermined flow position where the valve is partially opened to allow for a select predetermined amount of liquid flow.
Figure 3:
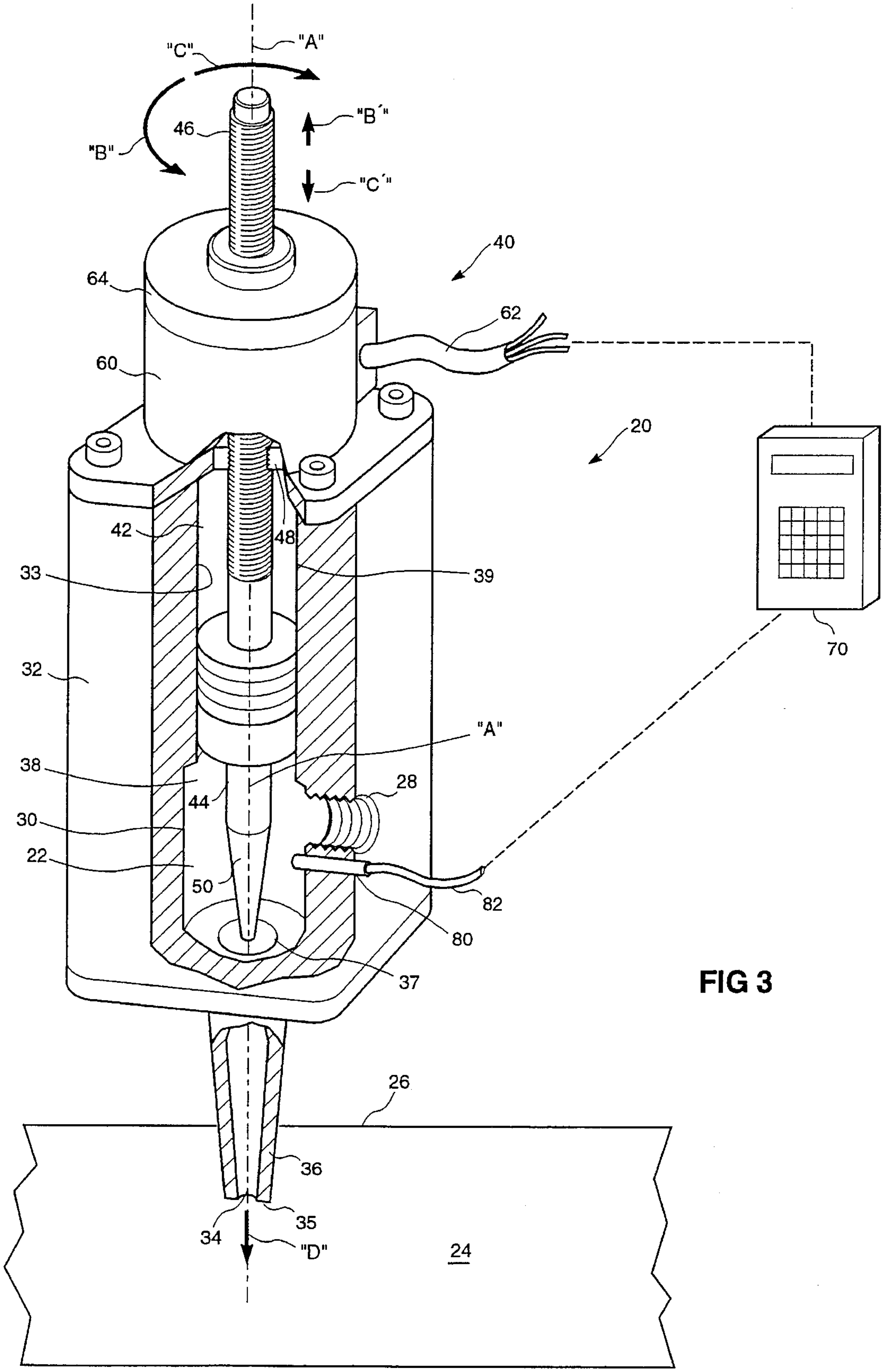
FIG. 3 is a view similar to FIG. 2, with the valve having been closed slightly to a reduced flow position as compared to FIG. 2 so as to decrease the flow of liquid therethrough.

Reference will now be made to FIGS. 1 through 3, which show a liquid dispensing device 20, for dispensing liquid 22 onto a receiving surface 24 of an article 26, as indicated by arrow "D". The dispensing device 20 has an inlet 28 for accepting the liquid 22 into a main chamber 30 defined by an external housing 32. A nozzle 36 extends outwardly from the end of the external housing 32 and terminates in an end portion 35 having a dispensing output opening 34 therein, with the dispensing output opening 34 being in fluid communication with the main chamber 30.

Housed within the continuous flow liquid dispensing device 20, is an improved flow control mechanism 40 that comprises an elongate shaft 42 having a front end 44, a back end 46, and a first centrally disposed longitudinal axis "A". The threaded elongate shaft 42 is retained in threadable engagement by a co-operating receiving member 48 securely mounted on the external housing 32. The threaded elongate shaft 42 is mounted for rotation in opposed first and second rotational directions, as indicated by arrows B and C, wherein rotation of the threaded elongate shaft 42 in the first and second rotational directions causes corresponding axially directed movement of the threaded elongate shaft 42, as indicated by arrows B' and C', between a first retracted position, as best shown in FIG. 2, and a second extended position, as best shown in FIG. 1.

A sealing means between the threaded elongate shaft 42 and the external housing 32 is in the form of a plurality of elastomeric rings 38 annularly disposed around a portion of the threaded elongate shaft 42 so as to slidingly engage in sealing relation the threaded elongate shaft 42 and so as to engage in sealing relation a co-operating inner wall surface 33 of a guide chamber 39. The guide chamber 39 is within the external housing 32 of the liquid dispensing device 20, and is in fluid communication with the main chamber 30. It is highly desirable that liquid from the chamber 30 does not reach the threaded receiving member 48, as the liquid would tend to coat the threaded elongate shaft 42, thus causing the threaded elongate shaft 42 to ultimately become stuck in one position within the co-operating threaded receiving member 48.

A valve means in the form of a needle valve 50 is securely attached to the front end 44 of the threaded elongate shaft 42 for corresponding axially directed movement therewith. The needle valve 50 is retained within the external housing 32 for movement with the threaded elongate shaft 42 between a full flow position where the needle valve 50 is retained in spaced relation with respect to the dispensing output opening 34 so as to permit a full flow of liquid from the main chamber 30 through the dispensing output opening 34, and a reduced flow position where the needle valve 50 is retained in a reduced spaced relation with respect to the dispensing output opening so as to permit a reduced flow of liquid from the main chamber 30 through the dispensing output opening 34. In the preferred embodiment, the reduced flow position is actually a flow precluding position where the needle valve 50 is intimately engaged against a co-operating seat portion 37 of the external housing 32 so as to preclude liquid flow between the needle valve 50 and the co-operating seat portion 37, thereby precluding fluid flow through the dispensing output opening 34. The first retracted position of the threaded elongate shaft 42 corresponds to the full flow position of the needle valve 50, and the second extended position of the elongate shaft 42 corresponds to the reduced flow position of the needle valve 50.

An electrically powered drive means in the form of a servomotor 60 mounted on the top end of the external housing 32 and is interconnected between the external housing 32 and the threaded elongate shaft 42 for selectively rotating the threaded elongate shaft 42 with respect to the external housing 32 in the opposed first and second rotational directions, as indicated by arrows B and C, between its first retracted position and its second extended position.

A control means in the form of a microprocessor 70 is connected in electrically conductive relation to the servomotor 60 by means of electrical wires 62, so as to provide control signals to the servomotor 60. In this manner, the microprocessor 70 causes the servomotor 60 to selectively control the movement of the servomotor 60, move the needle valve 50 between its full flow position and its reduced flow position.

Figure 4:
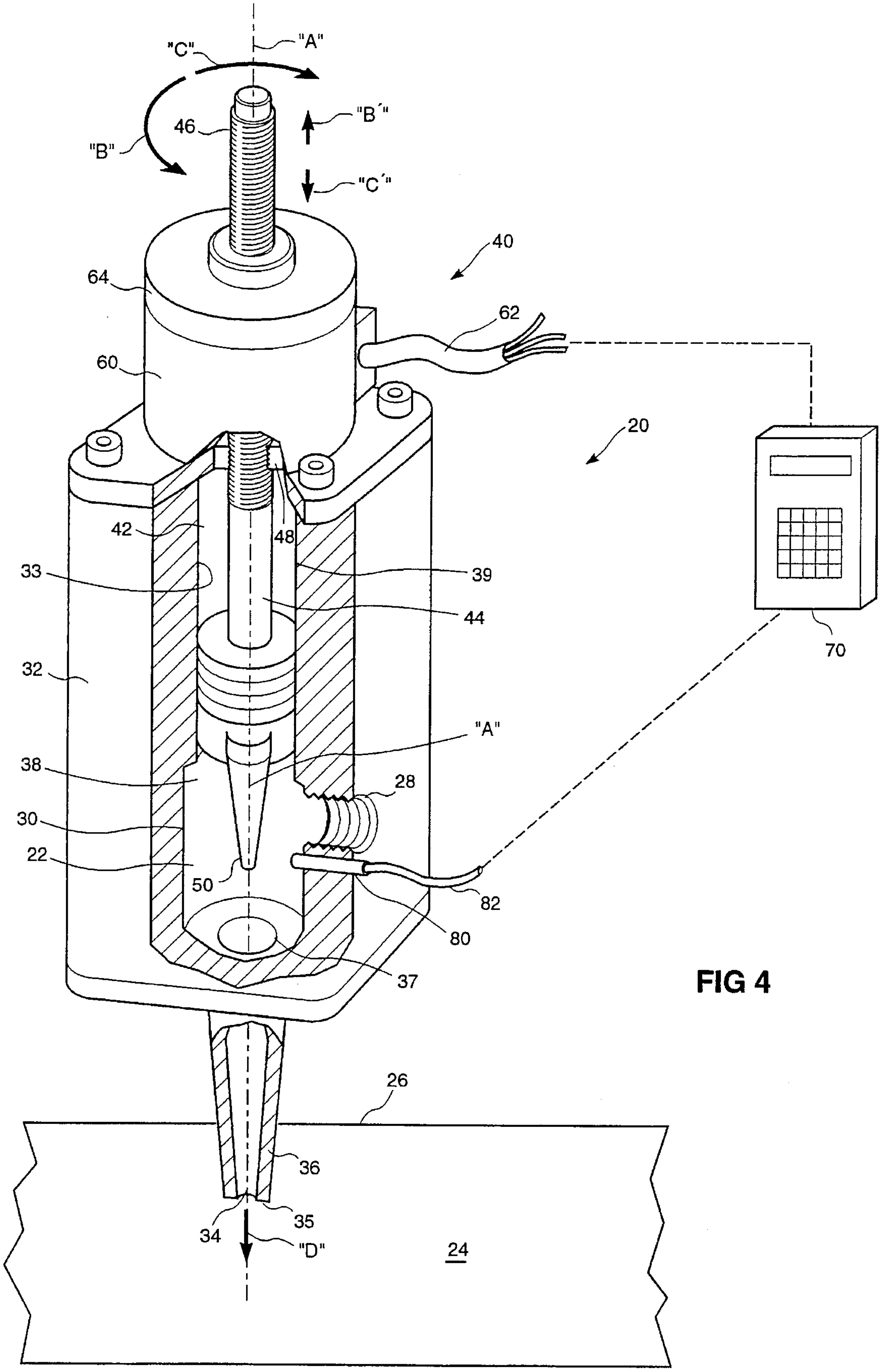
FIG. 4 is a view similar to FIG. 2, with the valve having been opened to a full flow position so as to increase the flow of liquid therethrough.

Sensor means—shown by way of a representative sensor 80—is mounted in the external housing 32 so as to be located in a position to sense one or more of selected parameters related to the operation of the liquid dispensing device 20. The sensor means can comprise means to sense the speed of the dispensing output opening 34 with respect to the receiving surface 24 of the article 26 receiving the liquid 22, or can comprise means to sense the temperature or viscosity of the liquid in the main chamber 30. The various sensor means 80 are electrically connected to the microprocessor 70 by means of electrical wires 82 so as to provide feedback signals regarding these parameters to the microprocessor 70. The microprocessor 70 then calculates control signals based on the feedback signals received from the sensor means 80 and transmits these control signals to the servomotor 60. The microprocessor 70 thereby controls the servomotor 60 according to the feedback signals, thus resulting in the position of the valve 50 being moved to any position between its full flow position, as shown in FIG. 4 and its flow precluding position, as shown in FIG. 1, according to the feedback signals received from the sensor means 80. The servomotor 60 also provides feedback signals from an encoder 64 to the microprocessor 70 as to the relative position of the elongate shaft 42 as it is rotated by the servomotor 60. The microprocessor 70 uses these feedback signals to ensure correct rotational positioning of the threaded elongate shaft 42 and thus the correct position of the needle valve 50.

In use, the needle valve 50 starts out in its flow precluding position, as shown in FIG. 1, and is moved by the servomotor 60 to a predetermined flow position, as shown in FIG. 2, so that the liquid 22 can flow out of the nozzle 36 and be dispensed onto the receiving surface 24 of the article 26. As feedback signals regarding the various parameters being monitored by the sensor means 80, is received by the microprocessor 70, the needle valve 50 may accordingly moved in a direction as indicated by arrow "C" to a reduced flow position as shown in FIG. 3, even to its flow precluding position—which is its ultimate reduced flow position—as shown in FIG. 1, and in the opposite other direction as indicated by arrow B' to its full flow position as shown in FIG. 4. In this manner, a corrected flow rate of liquid 22 is dispensed from the dispensing output opening 34 of the nozzle 36, so as to provide a constant volume output of liquid 22 per unit length of liquid dispensed over the receiving surface 24 of the article 26.

It can be seen that the improved flow control mechanism 40 of the present invention is used to control the rate of flow of liquid from the main chamber 30 through the dispensing output opening 34 in the nozzle 36. As part of this control, the initial "turn-on" of the liquid dispensing device 20—that is to say, the movement of the needle valve 50 from its flow precluding position to its flow permitting position—may be performed relatively slowly in a controlled manner, according to a predetermined "turn-on profile", so as to preclude a large amount of fluid from being initially dispersed. The "turn-on profile" is programmable into the microprocessor 70. Similarly, a suitable "turn-off" profile is also programmable into the microprocessor 70.

Figure 5:
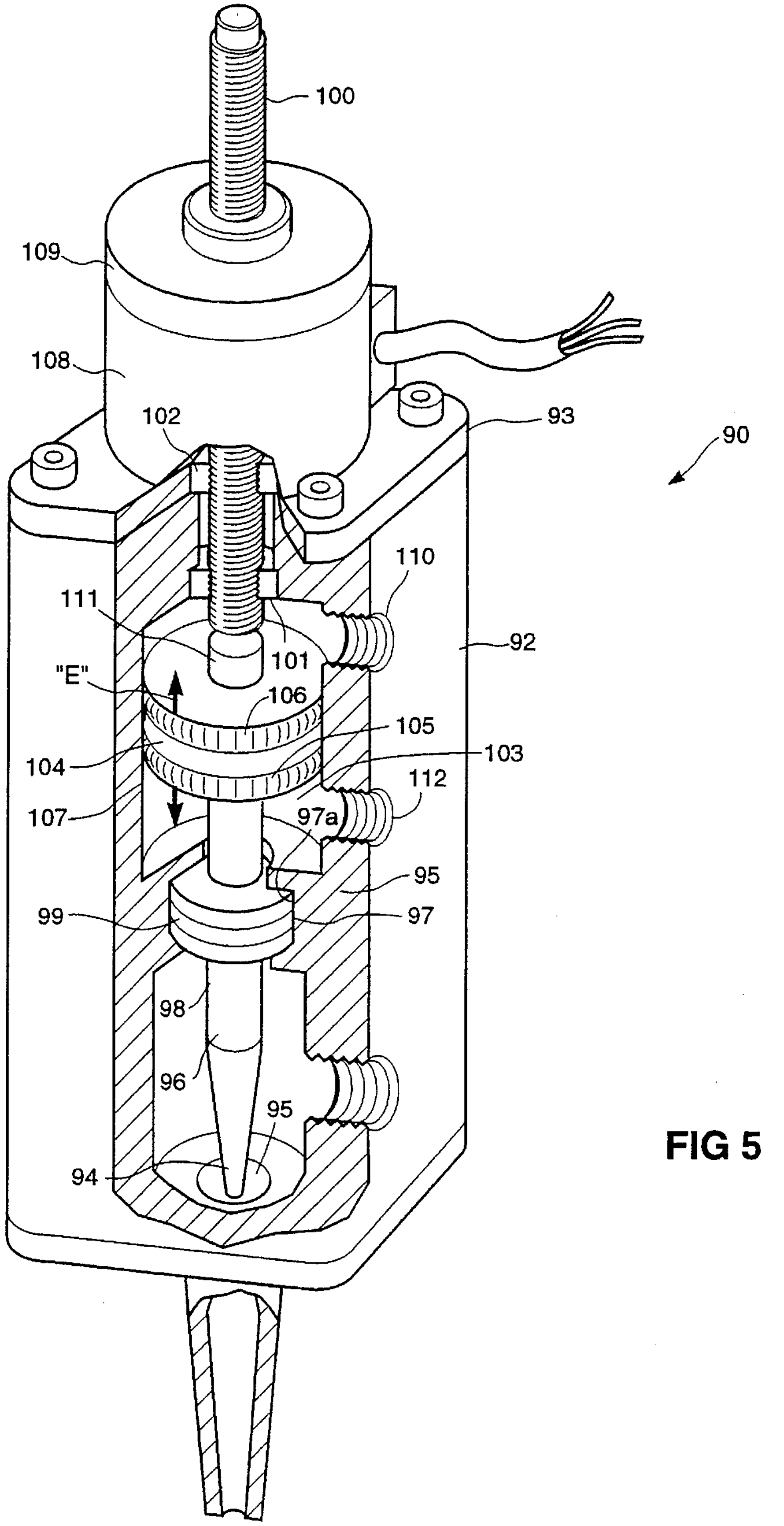
FIG. 5 is a perspective view of an alternative embodiment of the present invention.

In the preferred embodiment, the improved flow control mechanism 40 controls the needle valve 50 between a full flow position and a flow precluding position; however, it is possible to use a separate mechanism to turn on the flow of liquid and shut off the flow of liquid through the dispensing output opening 34 in the nozzle 36, while the needle valve 50 can be used to control the rate of the flow of liquid through the dispensing output opening 34 in the nozzle 36. This particular alternative embodiment improved flow control mechanism, as indicated by the general reference numeral 90 in FIG. 5, comprises an external housing 92, a needle valve 94 securely attached to the front end 96 of a first elongate shaft 98, for movement within the housing 92 between a flow precluding position whereat the needle valve 94 is in intimate contact with the co-operating seat portion 95, and flow permitting position, as will be discussed in greater detail subsequently. First elongate shaft 98 is slidably retained within the external housing 92 by co-operating seals in the form of elastomeric rings 99, which elastomeric rings 99 engage in sealing relation a co-operating inner wall surface 97 of a guide chamber 97 and slidingly engage in sealing relation the first elongate shaft 98. The seals 99 are preferably made from silicone rubber so as to withstand the high temperatures within the housing 92. A piston 104 is attached to the first elongate shaft 98 near the top end thereof. The piston 104 is slidably retained within an enlarged chamber 103, and indicated by arrow "E", and has a pair of annular seals 105 and 106 slidingly engage in sealing relation the inner wall 107 of the chamber 103. The position of the piston 104 within the chamber 103 is controlled by means of compressed air that enters and exits the chamber 103 through apertures 110 and 112, as supplied by suitable supply lines (not shown). The piston 104 is slidably moved within the chamber 103 so as to move the needle valve 94 between its flow precluding position, where the needle valve 94 is seated in the co-operating seat portion, and its flow permitting position.

A second threaded elongate shaft 100 is retained in threadable engagement by a co-operating receiving member 102 at the top end 93 of the housing 92. A servomotor 108 rotates the second threaded elongate shaft 100 so as to cause adjustment of the flow permitting position of the needle valve 94. The rotation of the servomotor 108, which has an integral encoder 109, is controlled by a microprocessor (not shown) in a manner analogous to that described in the preferred embodiment.

The bottom end 101 of the second threaded elongate shaft 100 contacts a friction pad 109 on the top of the piston 104 when the needle valve 94 and the first elongate shaft 98 are in their flow permitting position. In this manner, the second threaded elongate shaft 100 serves as a mechanical stop for the first elongate shaft 98 and, therefore, determines the flow permitting position of the needle valve 50.

In another alternative embodiment, it is contemplated that stepper motors could be used in place of servomotors to rotate the threaded elongate shafts, in some applications.

Other modifications and alterations may be used in the design and manufacture of the apparatus of the present invention without departing from the spirit and scope of the accompanying claims.

What is claimed is:

1. In an automatic continuous flow liquid dispensing device for dispensing liquid onto a receiving surface of an article, said dispensing device having an input for accepting liquid into a main chamber defined by an external housing and a dispensing output opening in a nozzle in liquid communication with said main chamber, an improved flow control mechanism comprising:

valve means operatively mounted within said external housing for movement between a full flow position where said valve means is retained in spaced relation with respect to said dispensing output opening so as to permit a full flow of liquid from said main chamber through said dispensing output opening, and any one of a plurality of reduced flow positions where said valve means is retained in a reduced spaced relation with respect to said dispensing output opening so as to permit only a reduced flow of liquid from said main chamber through said dispensing output opening;

electrically powered drive means operatively connected to said valve means for positioning said valve means to a selected one of said full flow position and said plurality of reduced flow positions;

control means operatively connected to said drive means for selectively controlling the movement of said valve means between said full flow position and said plurality of reduced flow positions;

a threaded elongate shaft having a front end, a back end, and a first centrally disposed longitudinal axis, said valve means being operatively attached to said threaded elongate shaft at said front end thereof, and said threaded elongate shaft being retained in threadable engagement by a co-operating threaded receiving member mounted on said external housing, for rotation in opposed first and second rotational directions by said electrically powered drive means; wherein rotation of said threaded elongate shaft in said first and second rotational directions causes corresponding axially directed movement of said threaded elongate shaft between a selected one of said full flow position and said plurality of reduced flow positions of said valve means, and another selected one of said full flow position and said plurality of reduced flow positions of said valve means; and temperature sensor means mounted in said external housing so as to sense the temperature of said liquid in said liquid dispensing device, said temperature sensor means being electrically connected to said control means so as to provide feedback signals to said control means;

whereby said control means is adapted to provide control signals to said drive means, for controlling said drive means to be positioned at any one of said selected flow positions of said valve means.

2. The improved flow control mechanism of claim 1, further comprising sealing means mounted between said threaded elongate shaft and said external housing to preclude the escape of said liquid between said threaded elongate shaft and said co-operating threaded receiving member.

3. The improved flow control mechanism of claim 1, wherein said electrically powered drive means is a servomotor operatively connected between said external housing and said threaded elongate shaft for selectively rotating said threaded elongate shaft with respect to said external housing in said opposed first and second rotational directions between said first retracted position and said second extended position.

4. The improved flow control mechanism of claim 1, wherein said valve means comprises a needle valve.

5. The improved flow control mechanism of claim 1, wherein said control means comprises a microprocessor.

6. The improved flow control mechanism of claim 1, wherein said sealing means comprises an elastomeric ring annularly disposed around a portion of said threaded elongate shaft so as to slidingly engage a co-operating inner wall surface of a guide chamber.

* * * * *